United States Patent
Menke et al.

(10) Patent No.: US 12,162,691 B2
(45) Date of Patent: Dec. 10, 2024

(54) MODULAR CONVEYOR MAT AND CONVEYOR MAT MODULE THEREFOR, AS WELL AS CONVEYOR SYSTEM

(71) Applicant: REXNORD FLATTOP EUROPE B.V., 'S-Gravenzande (NL)

(72) Inventors: Cornelis Hendrik Mijndert Menke, 's-Gravenhage (NL); Leonardus Adrianus Catharinus Cornelissen, 's-Gravenhage (NL)

(73) Assignee: REXNORD FLATTOP EUROPE B.V., 'S-Gravenzande (NL)

( * ) Notice: Subject to any disclaimer, the term of this patent is extended or adjusted under 35 U.S.C. 154(b) by 94 days.

(21) Appl. No.: 18/007,809

(22) PCT Filed: Jun. 4, 2021

(86) PCT No.: PCT/NL2021/050358
§ 371 (c)(1),
(2) Date: Dec. 2, 2022

(87) PCT Pub. No.: WO2021/246874
PCT Pub. Date: Dec. 9, 2021

(65) Prior Publication Data
US 2023/0227263 A1 Jul. 20, 2023

(30) Foreign Application Priority Data
Jun. 4, 2020 (NL) .................. 2025758

(51) Int. Cl.
*B65G 17/40* (2006.01)
*B65G 17/24* (2006.01)
*B65G 23/06* (2006.01)

(52) U.S. Cl.
CPC ............ *B65G 17/40* (2013.01); *B65G 17/24* (2013.01); *B65G 23/06* (2013.01)

(58) Field of Classification Search
CPC ........ B65G 17/40; B65G 17/24; B65G 23/06; B65G 17/08; B65G 17/083
(Continued)

(56) References Cited

U.S. PATENT DOCUMENTS 3,245,517 A * 4/1966 Ward .................. A24B 7/14
198/626.1
3,674,130 A * 7/1972 Carmichael ............ B65G 17/08
198/845

(Continued)

FOREIGN PATENT DOCUMENTS

EP 1842806 B1 10/2007
FR 2637877 A1 4/1990
(Continued)

OTHER PUBLICATIONS

Habasit, HabasitLINK(R) M2520 Roller Top 1", Product Data Sheet, Dec. 22, 2020, 2 pages.
(Continued)

*Primary Examiner* — Gene O Crawford
*Assistant Examiner* — Muhammad Awais
(74) *Attorney, Agent, or Firm* — Quarles & Brady LLP

(57) ABSTRACT

Modular conveyor mat (1), comprising a series of conveyor mat modules (2) successive in conveying direction, which conveyor mat modules are provided with a body part (5) extending transversely to a conveying direction, having a top (6) which bounds the body part at an upper side and a bottom (7) which bounds the body part at a lower side. The bottom is provided with a support surface (8) for supporting the body part on a plane guide (9). Successive conveyor mat modules are hingedly coupled with the aid of hinge pins (4) extending transversely to the conveying direction, reaching through hinge holes (16) in the coupling parts. At least a number of coupling parts are provided with a roller receiv- (Continued)

ing space (13) having included therein a roller (19) which is bearing-mounted on the hinge pin, such that an outer surface of the roller is located wholly above the support surface and projects at least partly above the top of the body part. The body part is provided at the bottom thereof with a recess which, between mutually facing parts of the outer surfaces of successive rollers, leaves clear a space for therein receiving a tooth of a driving gearwheel.

18 Claims, 8 Drawing Sheets

(58) Field of Classification Search
 USPC .................................................. 198/853, 779
 See application file for complete search history.

(56) References Cited

U.S. PATENT DOCUMENTS

| | | | | |
|---|---|---|---|---|
| 6,494,312 | B2* | 12/2002 | Costanzo | B65G 17/40 198/779 |
| 7,360,641 | B1* | 4/2008 | Fourney | B65G 17/40 198/779 |
| 7,997,404 | B2* | 8/2011 | Krisl | B65G 17/40 198/779 |
| 8,544,634 | B2 | 10/2013 | Fourney | |
| 8,944,236 | B2 | 2/2015 | Fourney | |
| 9,162,818 | B2* | 10/2015 | van den Berg | B65G 17/06 |
| 10,065,802 | B1* | 9/2018 | Chen | B65G 17/08 |
| 10,221,020 | B2* | 3/2019 | Menke | B65G 47/66 |
| 2005/0126896 | A1* | 6/2005 | Wieting | B65G 17/24 198/853 |
| 2006/0070857 | A1* | 4/2006 | Fourney | B65G 47/71 198/779 |
| 2007/0227861 | A1* | 10/2007 | Stebnicki | B65G 17/24 198/853 |
| 2011/0056807 | A1* | 3/2011 | Fourney | B65G 17/24 198/779 |
| 2014/0090961 | A1* | 4/2014 | Costanzo | B65G 47/53 198/779 |
| 2016/0159575 | A1* | 6/2016 | Fourney | B65G 17/46 198/779 |
| 2017/0144843 | A1 | 5/2017 | Pedersen et al. | |
| 2019/0135545 | A1 | 5/2019 | Felix | |

FOREIGN PATENT DOCUMENTS

| | | | |
|---|---|---|---|
| NL | 2013611 B1 | 10/2016 | |
| WO | WO-2010124719 A1 * | 11/2010 | ............ B65G 17/08 |
| WO | 2018194828 A1 | 10/2018 | |

OTHER PUBLICATIONS

Intralox, 0.60 inch (15.20 mm) Pitch Straight Belt: Series 1000, Product Information, https://www.intralox.com/belt-identifier/straight-belt/series-1000, Copyright Intralox 2023, 4 pages.
Movex, Modular Belt Series 530 LBP, Product Information, p. 212.
Movex, Modular Belt Series 530 Pro LBP, Product Information, p. 213.
Rexnord Corporation, Rexnord 1005 XLBP Series MatTop Chain Design Manual, Copyright Rexnord Corporation, Aug. 2021, 13 pages.
Rexnord Corporation, Rexnord 1005 XLBP Series MatTop Chain, Copyright Rexnord Corporation, Jan. 2021, 4 pages.
PCT International Search Report and Written Opinion, PCT/NL2021/050358, Sep. 9, 2021, 16 pages.

* cited by examiner

MODULAR CONVEYOR MAT AND CONVEYOR MAT MODULE THEREFOR, AS WELL AS CONVEYOR SYSTEM

CROSS-REFERENCE TO RELATED APPLICATIONS

This application is a 371 application of PCT/NL2021/050358 filed on Jun. 4, 2021, which claims priority of Netherlands patent application 2025758 filed on Jun. 4, 2020, both of which are incorporated by reference herein in their entirety.

The invention generally relates to modular conveyor mats and conveyor mat modules therefor, and more particularly to so-called roller mats.

Modular conveyor mats are generally known and are used for conveying products. With so-called roller mats, also referred to by the term of LBP (Low Back Pressure) conveyor mats, the conveying surface of the modular conveyor mat includes rollers for carrying the products to be conveyed. With such rollers, a product being conveyed on the conveyor mat may for instance be retained while the conveyor mat continues to move, without thrust being exerted on the product. The rollers are usually of cylindrical configuration but can also have a spherical shape.

The rollers may be disposed on the upper surface of the conveyor mat modules. In such a case, the rollers are bearing-mounted on roller shafts which are arranged on the conveying surface. With such a construction, a very high roller density of the conveying surface can be achieved. This type of construction, however, increases the height of the conveyor mat modules, which, for instance upon the conveyor mat rounding the bend pulleys, may lead to the formation of relatively large opening and closing gaps in the conveying surface between successive conveyor mat modules.

Preferably, the rollers are therefore included in the conveyor mat modules. In such a case, the rollers may be bearing-mounted on the hinge pins which connect the conveyor mat modules. The rollers are then provided with shaft holes through which the hinge pins extend. The rollers are then bearing-mounted on the hinge pins in such a manner that the outer surfaces of the rollers project at least partly above tops of body parts of the conveyor mat modules. With such a construction, the height of the conveyor mat modules can be small, so that gap formation can be limited to a large extent. With such a construction, the rollers usually have their outer surfaces projecting partly below the bottoms of the conveyor mat modules. The rollers can then be relatively simply driven from the lower side of the conveyor mat modules, for instance by means of friction with a strip in the track guide that is stationary with respect to the modular conveyor mat, or an actively driven driving roller. Thus, a product on the conveying surface can be manipulated, for instance by accelerating the product to increase the spacing between products or to turn the product on the conveying surface. Examples of such modular roller mats are Rexnord 1005 XLBP, the Intralox 1000 series, Movex 530 LBP and Habasit 2520 Roller Top.

A drawback of the known modular conveyor mats with rollers bearing-mounted on the hinge pins is that the conveying surface can only be provided with a limited number of rollers. Often, the rollers take the place of coupling parts, and the number of places where rollers can be included in the body part of the mat module is limited by the presence of the remaining coupling parts. As a result, rollers come to lie relatively far apart transversely to the conveying direction. Also, in placing the rollers, due account is to be taken of the position of wear strips in the track guide, or the other way around. By their bottoms, the mat modules are supported on such wear strips, so that locally no rollers can be included in the mat. As a result, transversely to the conveying direction, at the location of the wear strips, there is an interruption in the rows of rollers, and it is not possible to form a continuous row of rollers extending between the longitudinal edges of the conveyor mat. Further, in practice, mat modules of such conveyor mats, in order for them to be driven properly, have a pitch of for instance at least ca. 1 inch.

In practice, it is therefore difficult to support certain products on the conveying surface in a stable manner, and/or to have the supported products retain their orientation. Also, it is hard to realize a close linkup between successive conveyor, so that in practice often a transition arises on which products may stay behind.

The object of the invention is to provide a conveyor mat module for a modular conveyor mat and a conveyor mat built up from such conveyor mat modules, with which, while maintaining the advantages mentioned, the disadvantages mentioned can at least partly be counteracted.

To this end, the invention provides a modular conveyor mat, comprising a series of conveyor mat modules successive in conveying direction, which conveyor mat modules are provided with a body part extending transversely to a conveying direction, having a top which bounds the body part at an upper side and a bottom which bounds the body part at a lower side, wherein the bottom is provided with a support surface for supporting the body part on a plane guide, wherein the body part, at front and rear sides as viewed in the conveying direction, is provided with a series of coupling parts and receiving spaces alternately successive transversely to the conveying direction, and wherein coupling parts and receiving spaces of conveyor mat modules successive in the conveying direction interdigitate, and wherein successive conveyor mat modules are hingedly coupled with the aid of hinge pins extending transversely to the conveying direction and reaching through hinge holes in the coupling parts, and wherein at least a number of coupling parts are provided with a roller receiving space having included therein a roller which is bearing-mounted on the hinge pin, such that an outer surface of the roller is located wholly above the support surface and projects at least partly above the top of the body part, and wherein the body part at the bottom thereof is provided with a recess which, between mutually facing parts of the outer surfaces of successive rollers, leaves clear a space for therein receiving a tooth of a driving gearwheel.

By providing coupling parts with rollers bearing-mounted on the hinge pin in such a way that outer surfaces of the rollers are located above the support surface and that between mutually facing parts of the outer surfaces of successive rollers with a recess a space is left clear for therein receiving a tooth of a driving gearwheel, a relatively high roller density can be achieved. In particular, by providing the coupling parts with roller receiving spaces, the coupling parts located next to each other in the conveying direction can each be provided with a roller. In this way, the number of places where rollers can be included in the body part of the mat module can be increased, and the rollers can be placed relatively close to each other transversely to the conveying direction. Due to the outer surfaces of the rollers being located above the support surface, there is no need, in placing the rollers, to take the position of wear strips in the track guide into account. In this way, it is possible to form a continuous row of rollers, which extends between the longitudinal edges of the conveyor mat. By including the rollers on the hinge pins in the roller receiving spaces in a manner such that between mutually facing parts of the outer surfaces of successive rollers a space is left clear as a drive chamber for receiving therein a tooth of a driving gearwheel, there is no need to form in bottom of the mat module a drive chamber defined wholly by the walls of the body part. In consequence, the pitch of the mat modules can be considerably reduced, for instance to ca. 0.25-0.5 inch, or ca. 6-15 mm. Due to this, in the conveying direction, the roller density can be greatly increased, while between successive conveyor mats a close linkup can be realized on which products do not stay behind.

In particular, with the aid of the above-mentioned measures, a roller density of between 3500-6000 rollers/m2 can be achieved, preferably a roller density of between 4000-6000 rollers/m2, in particular a roller density of ca. 5500 rollers/m2 of the top surface of the conveyor mat.

By providing conveyor mat modules with a central rib extending transversely to the longitudinal axis, from which central rib the coupling parts, viewed transversely to the conveying direction, extend alternately forwards and rearwards in the conveying direction, a robust and compact construction can be achieved. When the recess in the body part is at least partly formed as a recess in the central rib, the compactness in the conveying direction can be augmented further, and the pitch of the conveyor mat modules can be reduced. When the central rib is located nearer to the top of the body part than to the bottom of the body part, the compactness can be augmented still further, and a very small pitch can be realized.

When the coupling parts comprise a pair of coupling arms extending on both sides of the roller receiving space, a proper force transmission can be achieved with relatively little material. By further providing the coupling arms each near a free end with hinge holes, a compact build can be realized. The outer surface of the roller may then reach beyond the coupling arms.

When the coupling arms extend from the central rib, and the recess in the body part comprises a free intermediate space between the coupling arms, bounded by a lower side of the central rib, a conveyor mat module can be realized with a very small pitch.

By placing the axis of the hinge holes in the coupling part nearer to the top of the conveyor mat module than to the bottom, it can be relatively simply achieved that while the roller by its outer surface does project at least partly above the top of the body part of the conveyor mat module, it is yet located wholly above the bottom of the body part, in particular above the support surface thereof.

By connecting the roller directly with the coupling part via a detachable connection, it can be achieved that the rollers continue to be connected with the conveyor mat module when the hinge pins have been detached. This facilitates assembly of the conveyor mat. The detachable connection may for instance be implemented as a snap connection. The detachable connection is hence additional to the connection via the hinge pin, and remains intact when the hinge pin has been removed. The detachable connection may for instance be implemented as collars on mutually facing sidewalls adjacent to the receiving space, of the coupling arms which each cooperate with a hole in a roller sidewall, which is concentric and slightly oversize with respect to a hole for the hinge pin.

By providing the body part with an assist support surface, it can be achieved that the conveyor mat module can be supported on an additional part of a track guide. In particular, provision can be made for a curved assist support surface for cooperation with a part of a track guide that is curved transversely to a plane part of a track guide. Elegantly, conveyor modules may for instance in a first angular position be supported via their support surface on a plane straight part of the track guide, and in a second angular position be supported on a curved part of the track guide. Via such an assist support surface, successive conveyor mat modules can, for instance upon rounding, pivot relative to each other from a first position in which they are supported on an upper part of the track guide, to a second position in which they are supported on a curved surface of a rounding nose. In both the first and the second position, the rollers can then remain free of contact with the track guide.

The assist support surface may also form a part of the bottom of the conveyor mat module that recedes or is reduced with respect to the support surface, so that the conveyor mat module in the second position can be supported via the roller on the track guide, and/or so that the roller becomes accessible from the lower side of the conveyor mat module to cooperate with the tread of a driving element, for instance with a profiled strip or driving roller.

Especially when the outer surface of the roller projects at least partly below the assist support surface, the roller can be made properly accessible from the lower side of the conveyor mat module to cooperate with the tread of such driving element. By supporting the body parts, via the assist support surface, on a further part of the track guide, it can be ensured that the rollers make contact, for instance through friction with a strip in the track guide that is stationary with respect to the modular conveyor mat, or an actively driven driving roller.

By having coupling elements adjacent a longitudinal edge of the conveyor mat be free of a roller receiving space, coupling parts located adjacent the longitudinal edges can be adapted for fulfilling a different function. Thus, coupling elements adjacent to a conveyor mat longitudinal edge can be provided with a hinge pin locking. Such a hinge pin locking may for instance be implemented as a receiving space having included therein a locking element which reaches into the hinge hole and which can restrain the hinge pin from axial migration.

Coupling parts successive transversely to the conveying direction of interdigitating conveyor modules may, optionally in combination with the above measure, each be provided with a roller receiving space having a roller received therein, so that a continuous row of rollers extending between the longitudinal edges of the conveyor mat is formed.

The invention also relates to a conveyor mat module, in particular for a conveyor mat according to the invention, comprising a body part extending transversely to a conveying direction, having a top which bounds the body part at an upper side and a bottom which bounds the body part at a lower side, wherein the bottom is provided with a support surface for supporting the body part on a plane guide, wherein the body part, at front and rear sides as viewed in the conveying direction, is provided with a series of coupling parts and receiving spaces alternately successive transversely to the conveying direction, and wherein coupling parts and receiving spaces can interdigitate with receiving spaces and coupling parts of correspondingly shaped conveyor mat modules successive in the conveying direction, and wherein the coupling parts are provided with hinge holes so that successive conveyor mat modules are hingedly couplable with the aid of hinge pins extending transversely to the conveying direction through the hinge holes, and wherein at least a number of coupling parts are provided with a roller receiving space for during use including therein a roller bearing-mounted on the hinge pin, such that an outer surface of the roller is located wholly above the support surface and projects at least partly above the top of the body part, and wherein the body part at the bottom thereof is provided with a recess which during use, between mutually facing parts of the outer surfaces of successive rollers, leaves clear a space for therein receiving a tooth of a driving gearwheel. Preferably, in the roller receiving space a roller is included, for instance via a detachable connection directly connected with the coupling part, i.e., in addition to a connection, if any, via a hinge pin.

The invention further relates to a conveyor system comprising a modular conveyor mat which is provided with at least one conveyor mat module with a support surface located at the bottom of the body part of the conveyor mat module, with an assist support surface which forms a part of the bottom of the conveyor mat module that recedes or is reduced with respect to the support surface, and with at least one roller received in a roller receiving space of the conveyor mat module, an outer surface of which roller is located wholly above the support surface, projects partly with respect to the assist support surface, and projects at least partly above a top of the body part of the conveyor mat module, which conveyor system further comprises a guide track with a plane guide on which conveyor mat modules of the modular conveyor mat are supported by way of their support surfaces, and a driving element included in the track guide, a contact surface of the driving element cooperating with the tread of a part projecting with respect to an assist support surface, of the outer surface of at least one roller of at least one of the conveyor mat modules. The driving element may then comprise a profiled strip included in the guide track, with profiles of the profiled strip forming contact surfaces for cooperation with treads of rollers of successive conveyor mat modules of the modular conveyor mat in the conveying direction. The contact surface of the driving element may project with respect to the guide track to drive a modular conveyor mat roller passing therealong in the conveying direction.

As regards the disclosure made here, it is noted that the above-mentioned technical measures, whether or not included in a dependent claim, may also each per se be used to advantage, and if desired can also be used in random combinations in a modular conveyor mat and a conveyor mat module therefor. This also concerns combination of the discussed measures separately or in random combination with a modular conveyor mat and a conveyor mat module therefor in which not all measures of the independent claim are used, for example a modular conveyor mat comprising a series of conveyor mat modules successive in conveying direction, which conveyor mat modules are provided with a body part extending transversely to a conveying direction, having a top which bounds the body part at an upper side and a bottom which bounds the body part at a lower side, wherein the body part, at front and rear sides as viewed in the conveying direction, is provided with coupling parts and receiving spaces, and wherein coupling parts and receiving spaces of conveyor mat modules successive in the conveying direction interdigitate, and wherein successive conveyor mat modules are hingedly coupled with the aid of hinge pins extending transversely to the conveying direction, reaching through hinge holes in the coupling parts.

The invention will be further explained on the basis of a nonlimiting exemplary embodiment which is represented in a drawing. In the drawing.

It is noted that the figures are merely schematic representations of a preferred embodiment of the invention. In the figures, identical or corresponding parts are represented with the same reference numerals.

Figure 1:
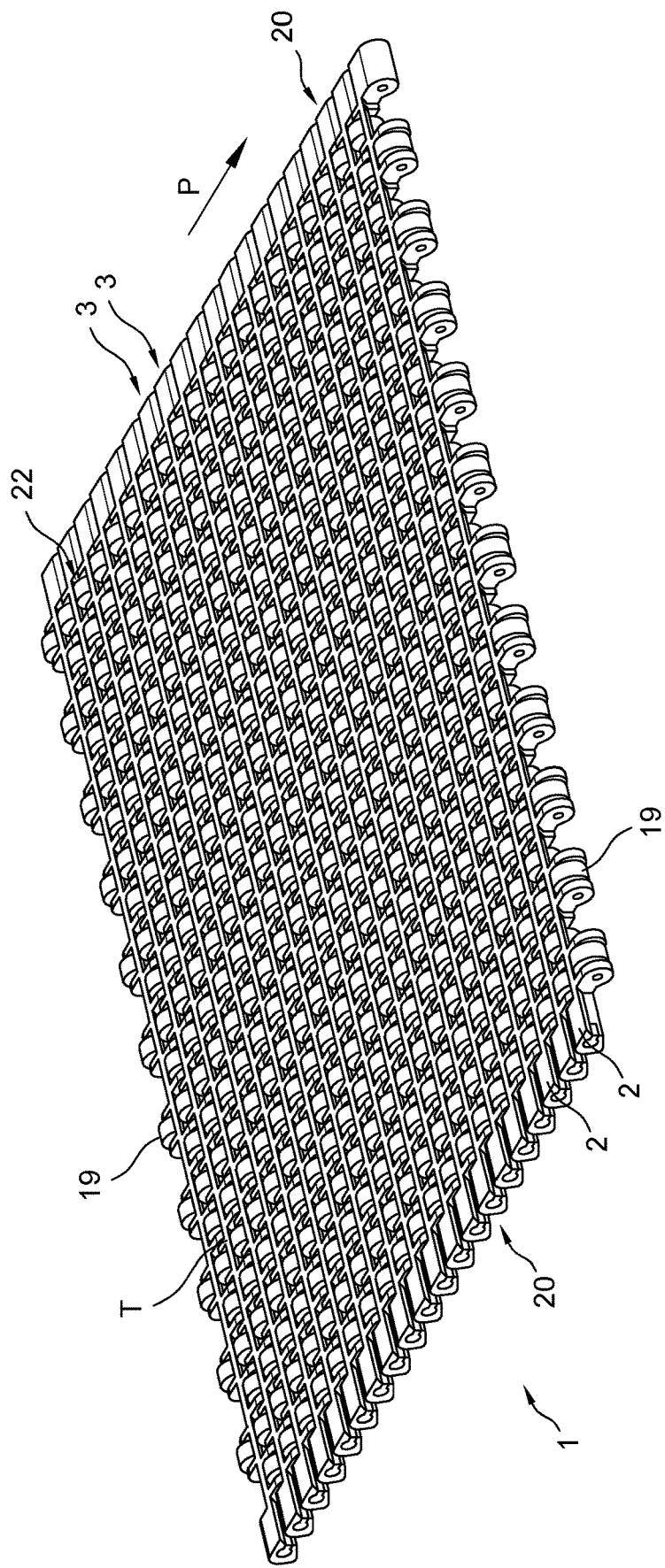
FIG. 1 shows a schematic perspective top view of a modular conveyor mat.
Figure 2:
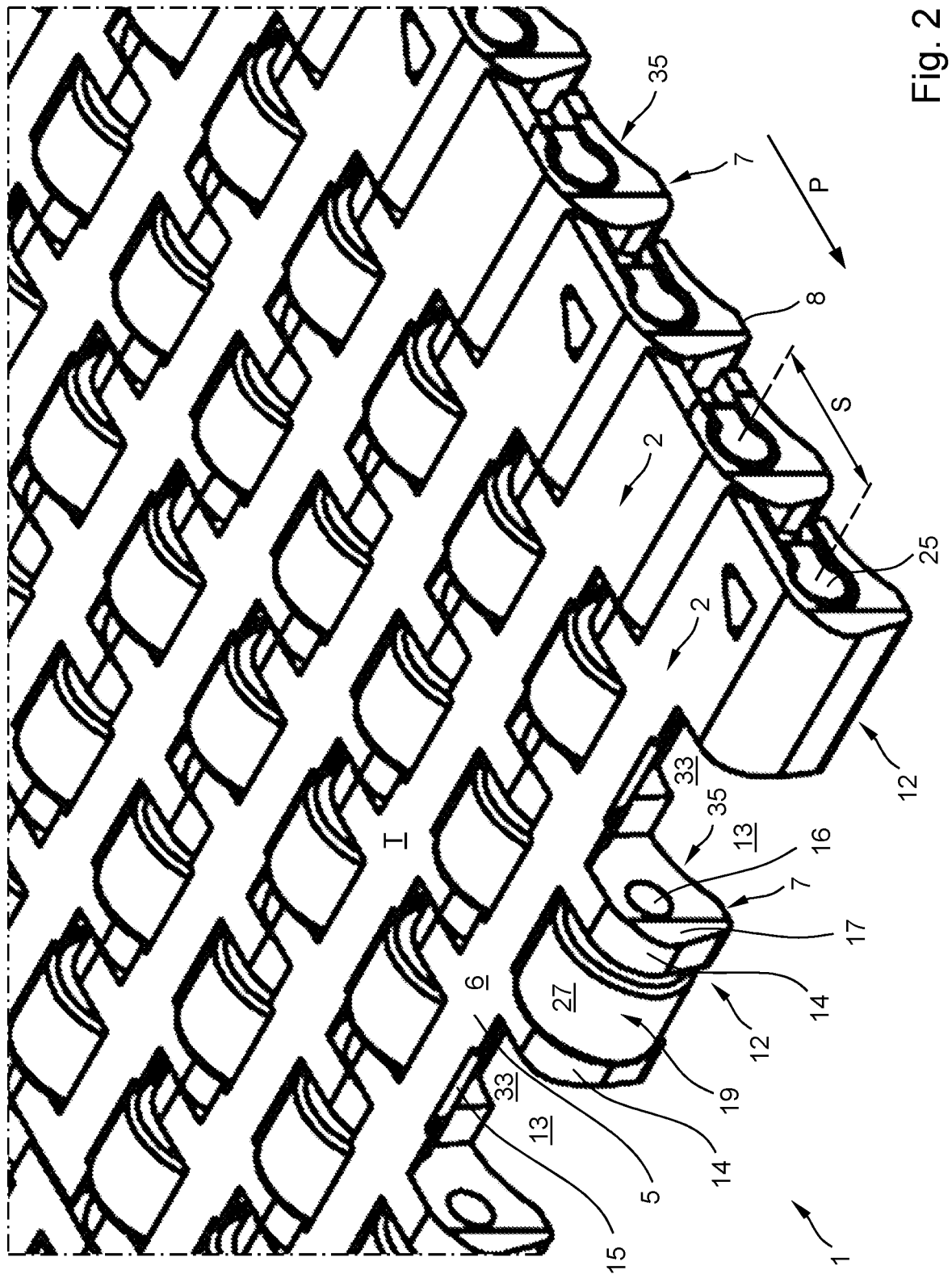
FIG. 2 shows a schematic perspective top view of a detail of a longitudinal edge of the modular conveyor mat of FIG. 1.
Figure 3:
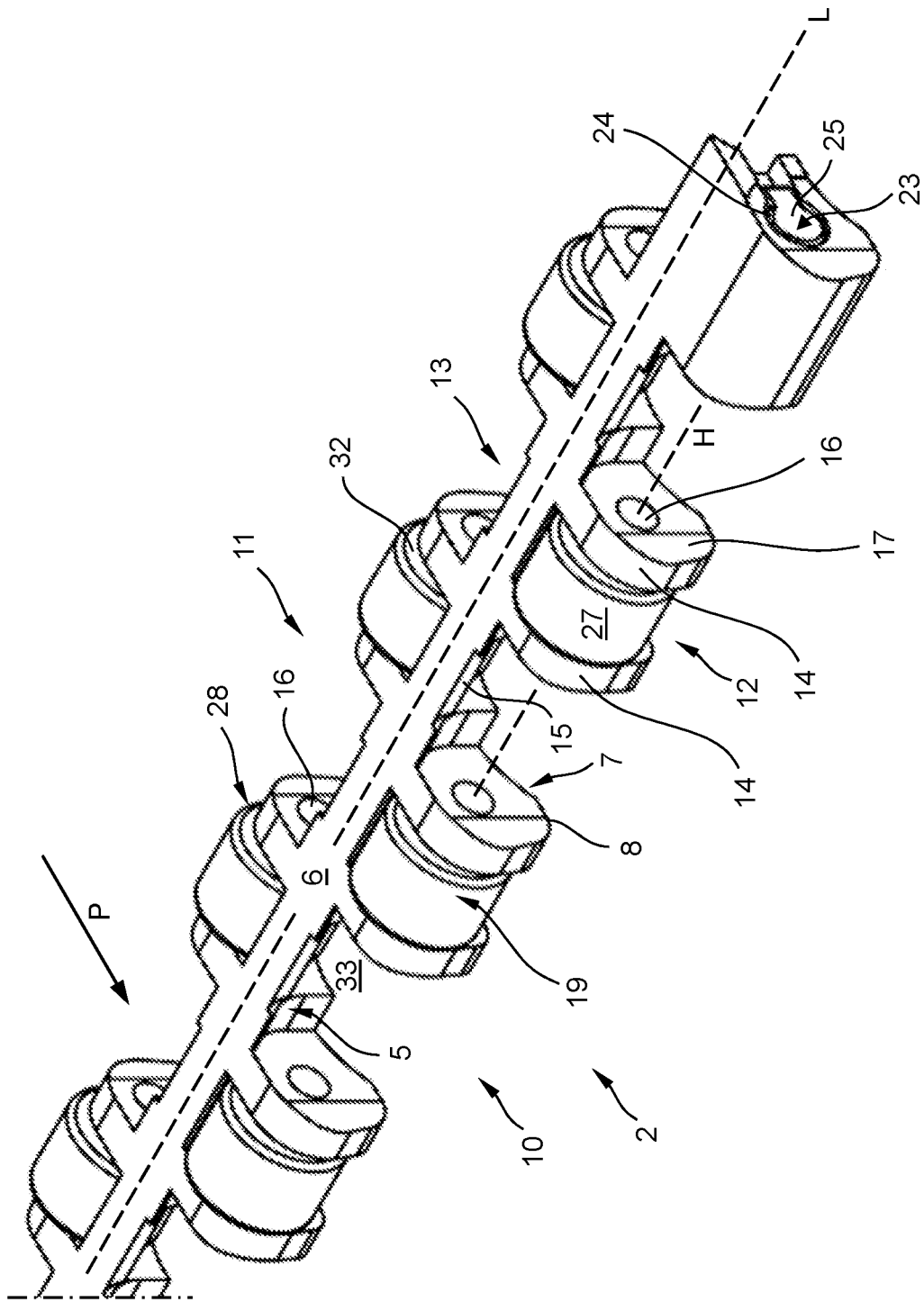
FIG. 3 shows a schematic perspective top view of a part of a conveyor mat module of the conveyor mat of FIG. 1 that is located at the longitudinal edge.
Figure 4:
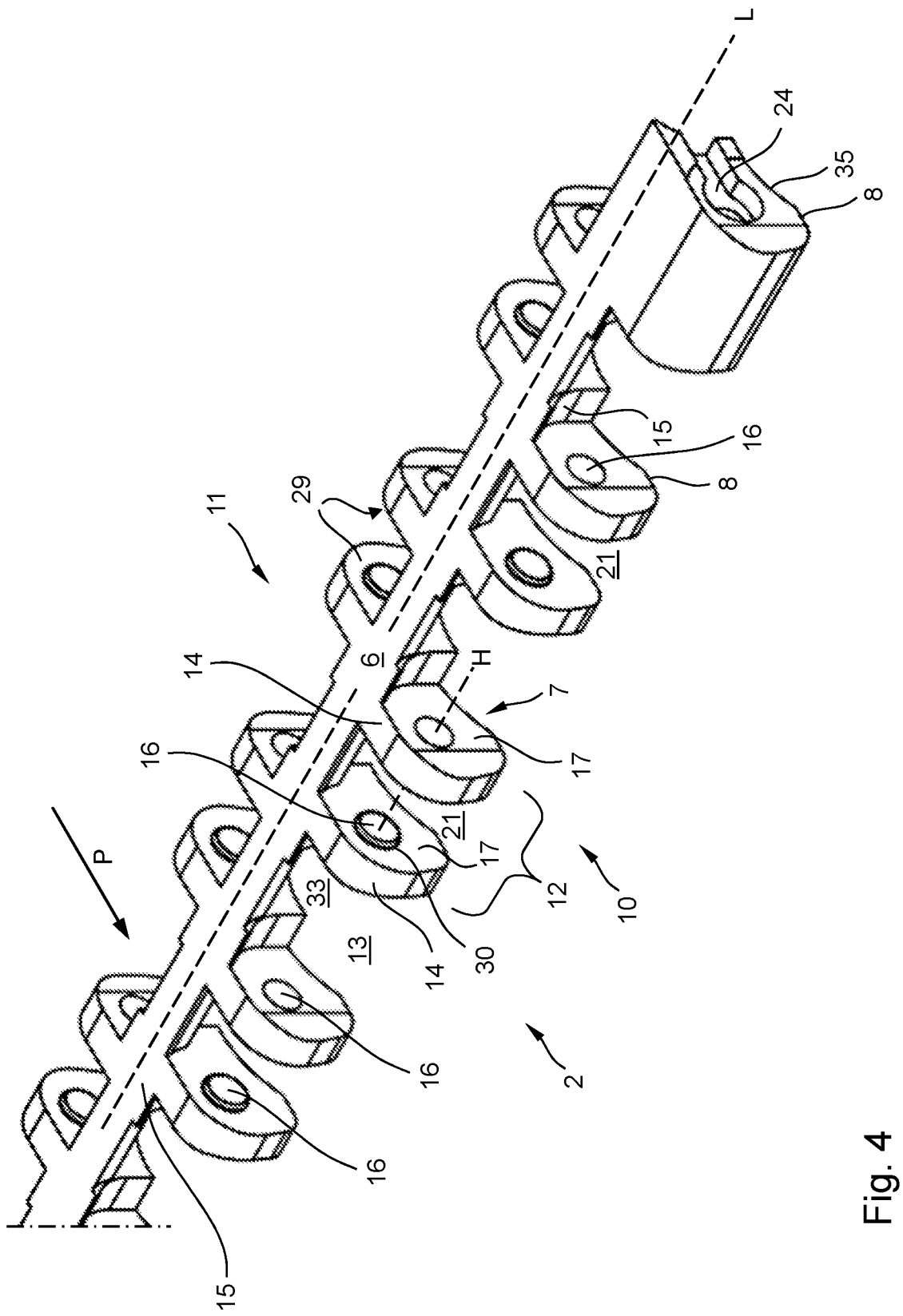
FIG. 4 shows a schematic perspective top view of the conveyor mat module of FIG. 3 without rollers.
Figure 5:
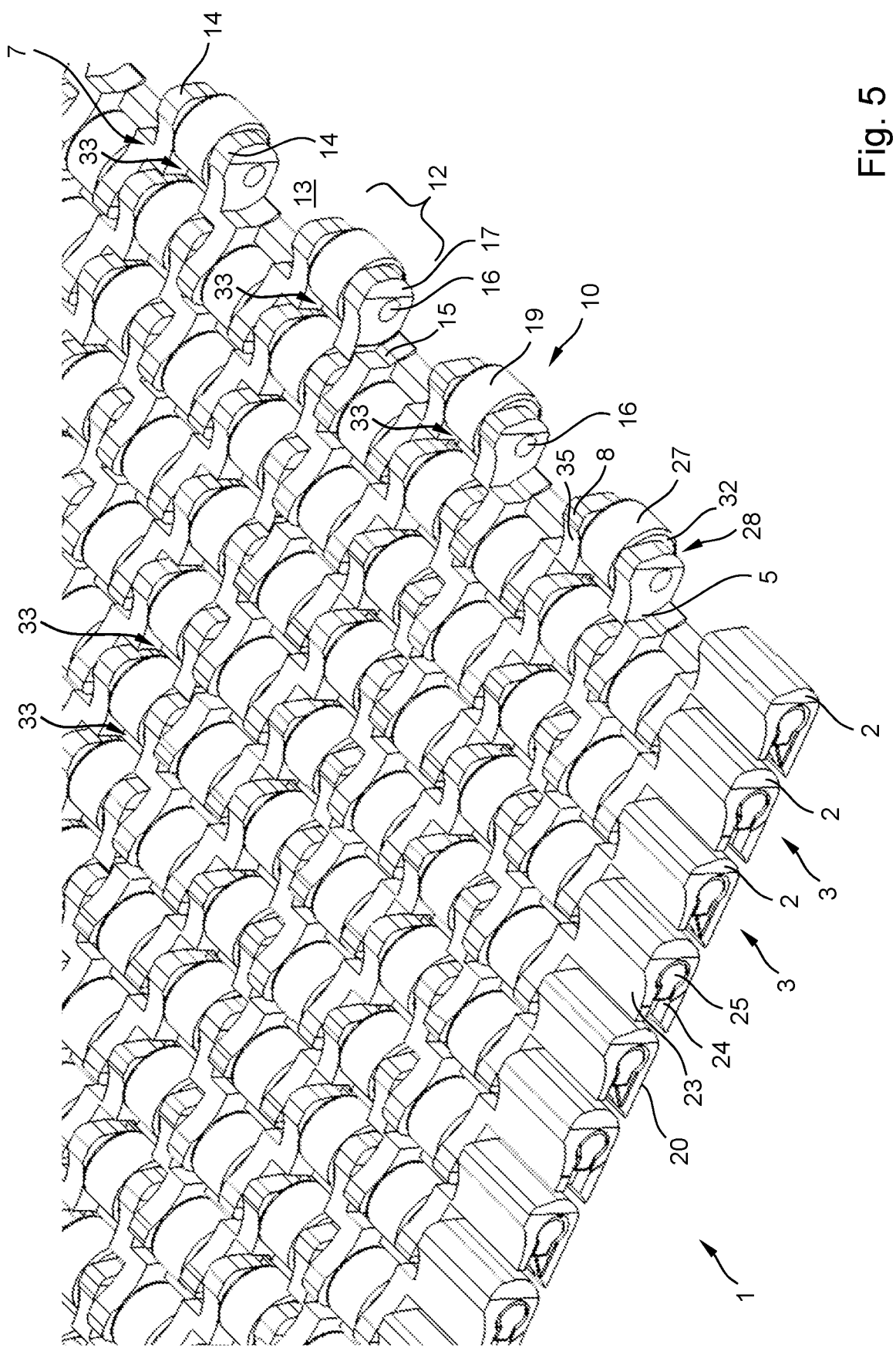
FIG. 5 shows a schematic perspective bottom view of a detail of a longitudinal edge of the modular conveyor mat of FIG. 1.
Figure 6:
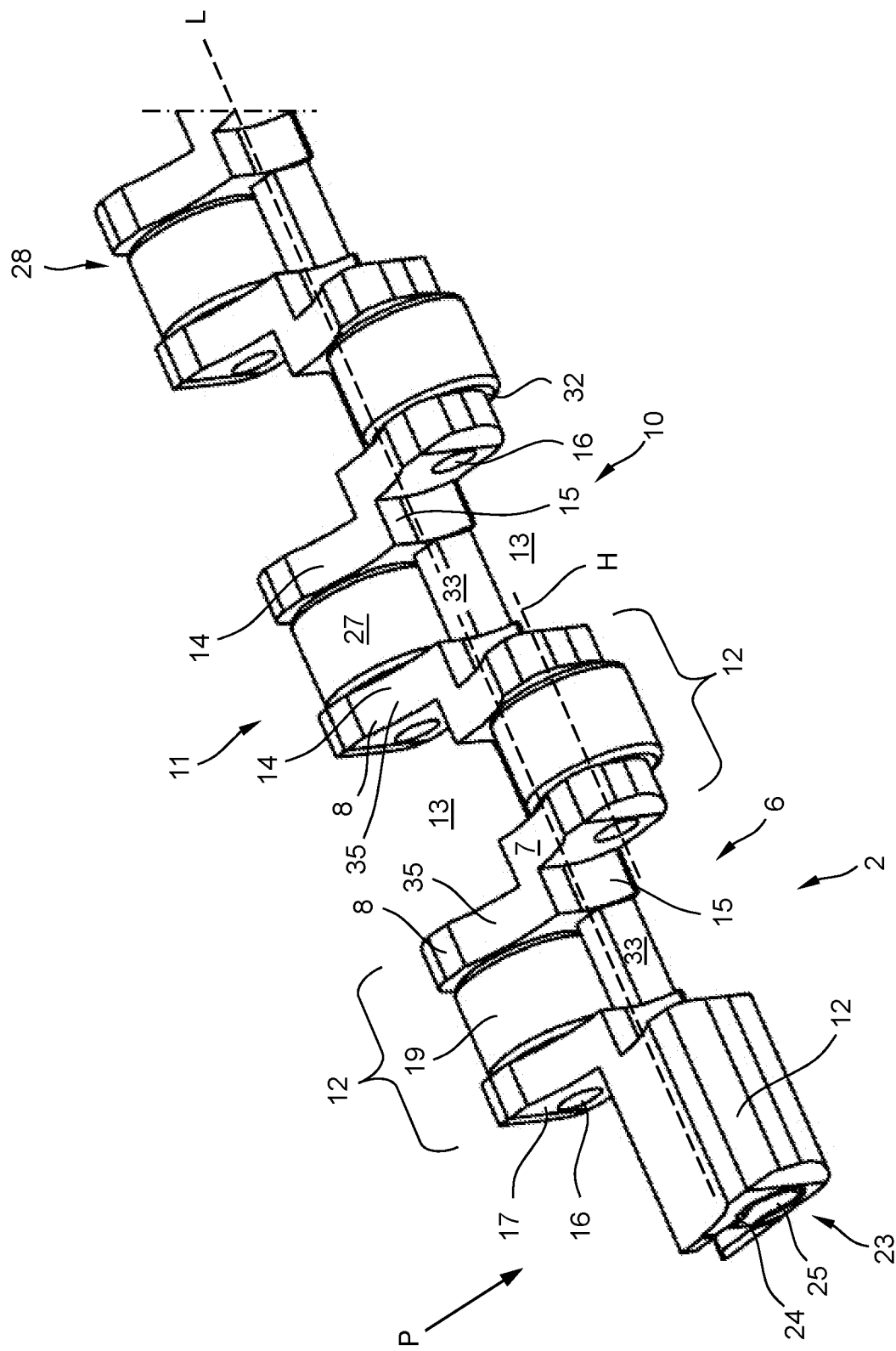
FIG. 6 shows a schematic perspective bottom view of a part of a conveyor mat module of the conveyor mat of FIG. 1 that is located at the longitudinal edge.
Figure 7:
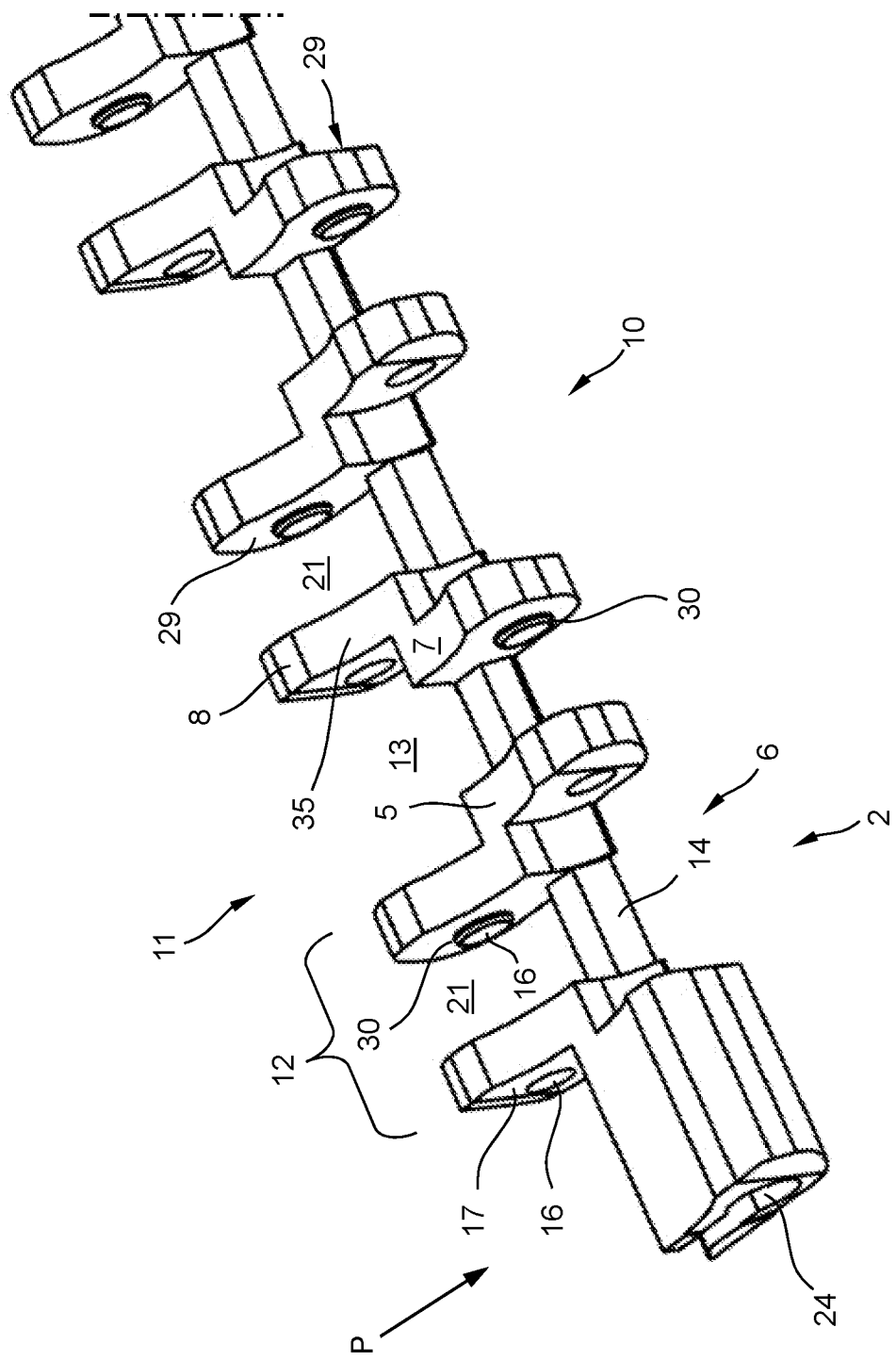
FIG. 7 shows a schematic perspective bottom view of the conveyor mat module of FIG. 6 without rollers.

FIGS. 1-9 show a first exemplary embodiment of a modular conveyor mat 1. The modular conveyor mat 1 comprises a series of conveyor mat modules 2 successive in a conveying direction P. In this exemplary embodiment, the conveyor mat 1 is built up from a number of rows 3 successive in the conveying direction P, of conveyor mat modules 2 which are coupled with the aid of hinge pins 4 extending transversely to the conveying direction P across the width of the conveyor mat 1. In this exemplary embodiment, transversely to the conveying direction P, several conveyor mat modules 2 are located next to each other, and conveyor mat modules 2 successive in the conveying direction P are staggered with respect to each other according a brick pattern.

The conveyor mat modules 2 are provided with a body part 5 extending transversely to a conveying direction P, having a top 6 which bounds the body part at an upper side, and a bottom 7 which bounds the body part 5 at a lower side. The bottom 7 is provided with a support surface 8 for supporting the body part 5 on a plane guide. The body part 5, at a front 10 and a rear 11 as viewed in the conveying direction P, is provided with a series of coupling parts 12 and receiving spaces 13 alternately successive transversely to the conveying direction P. In this exemplary embodiment, the coupling elements 12 and receiving spaces 13 at the front 10 and the rear 11 of the conveyor mat module are staggered. Coupling parts 12 and receiving spaces 13 of conveyor mat modules 2 successive in conveying direction P interdigitate. In this exemplary embodiment, the coupling parts 12 comprise a pair of coupling arms 14 extending on both sides of the roller receiving space 21.

The conveyor mat modules 2 are provided with a central rib 15, extending along the longitudinal axis L, from which the coupling parts 12, viewed transversely to the conveying direction P, extend alternately forwards and rearwards in conveying direction. The central rib 15 in this exemplary embodiment is located nearer to the top 6 of the body part 5 than to the bottom 7 of the body part 5.

Successive conveyor mat modules 2 are hingedly coupled in that the hinge pins 4 extending transversely to the conveying direction P reach through hinge holes 16 in the coupling parts 12. In this exemplary embodiment, the coupling arms 14 are each near a free end 17 thereof provided with hinge holes 16. Successive conveyor mat modules 2 can thus pivot relative to each other about an axis parallel to the conveying surface T formed by the tops 6 of successive conveyor mat modules 2 and transverse to the conveying direction P so that the conveyor mat can for instance circulate in an endless loop around a set of gearwheels, for instance between a driving gearwheel 18 and a nondriven return element, for example a return pulley.

The conveying surface T of the modular conveyor mat 1 is provided with rollers 19 for carrying products to be conveyed. The rollers 19 are included in the conveyor mat modules 2. A number of coupling parts 12 located next to each other are, to that end, provided with a roller receiving space 21 having received therein a roller 19 which is bearing-mounted on the hinge pin 4. Between the longitudinal edges 20 of the conveyor mat 1, a continuous row 22 of rollers 19 is formed.

Coupling parts 12 adjacent a longitudinal edge 20 of conveyor mat 1 are free of a roller receiving space 21, and are provided with a hinge pin locking 23. The hinge pin locking 23 in this exemplary embodiment is implemented as a receiving space 24 having received therein a locking element 25 reaching into the hinge hole 16, and which can restrain the hinge pin 4 from axial migration.

The rollers 19 are of cylindrical configuration and are provided with shaft holes 26 through which extend the hinge pins 4. The bearing arrangement of the roller 19 is such that an outer surface 27 of the roller 19 is located wholly above the support surface 8 and projects partly above the top 6 of the body part 5. In this exemplary embodiment, the axis H of the hinge holes 16 in the coupling parts 12 is located nearer to the top 6 of the conveyor mat module 2 than to the bottom 7, and the outer surface of the roller 19 reaches beyond the coupling arms 14.

The rollers 19 are here detachably connected with the coupling parts 12 of the body part 5 of the conveyor mat modules 2, so that the rollers 19 continue to be connected with the conveyor mat module 2 when the hinge pins have been detached. The detachable connection in this example is implemented as a click or snap connection 28. The snap connection 28 comprises a set of collars 30 on the mutually facing sidewalls, adjacent to the receiving space, of the coupling arms 14. The collars 30 each cooperate with a hole 31 in a sidewall 32 of the roller 19, which hole 31 is concentric and slightly oversize with respect to a shaft hole 26 for the hinge pin 4. Thus, the roller 19, under the weight load of a product carried thereon, will be supported on the hinge pin 4, and bearing-mounted on the hinge pin.

The body part 5 is provided at the bottom 7 thereof with a recess 33. The recess 33 leaves clear, between mutually facing parts of the outer surfaces 27 of successive rollers 19, a space for receiving therein a tooth 34 of a driving gearwheel 18. As is properly visible in FIG. 9, the recess thus forms a drive chamber, whose driving faces are formed by parts of the outer surfaces 27 of rollers 19 successive in conveying direction. The recess 33 in the body part 5 in this example is partly formed as a recess 33 in the central rib 15, and comprises a free interspace between the coupling arms 14, bounded by an underside of the central rib 15. Owing to the drive chamber realized between the outer surfaces 27 of the rollers 19, the pitch S of the conveyor mat modules 2 in this example is only ca. 15 mm. Owing to the continuous row 22 of rollers 19 and the small pitch S, the roller density in this example is 5500 rollers 19/m2 of the top surface of the conveyor mat 1.

In this exemplary embodiment, the body part 5 is provided with a curved assist support surface 35 which recedes with respect to the support surface 8. The assist support surface 35 can for instance cooperate with a track guide curved part 36 curved transversely to a track guide plane part 9. The assist support surface 35 may also stay clear of the track guide, and function to have the conveyor mat modules 2 actually supported via the outer surfaces 27 of the rollers 19 on the track guide.

Figure 8:
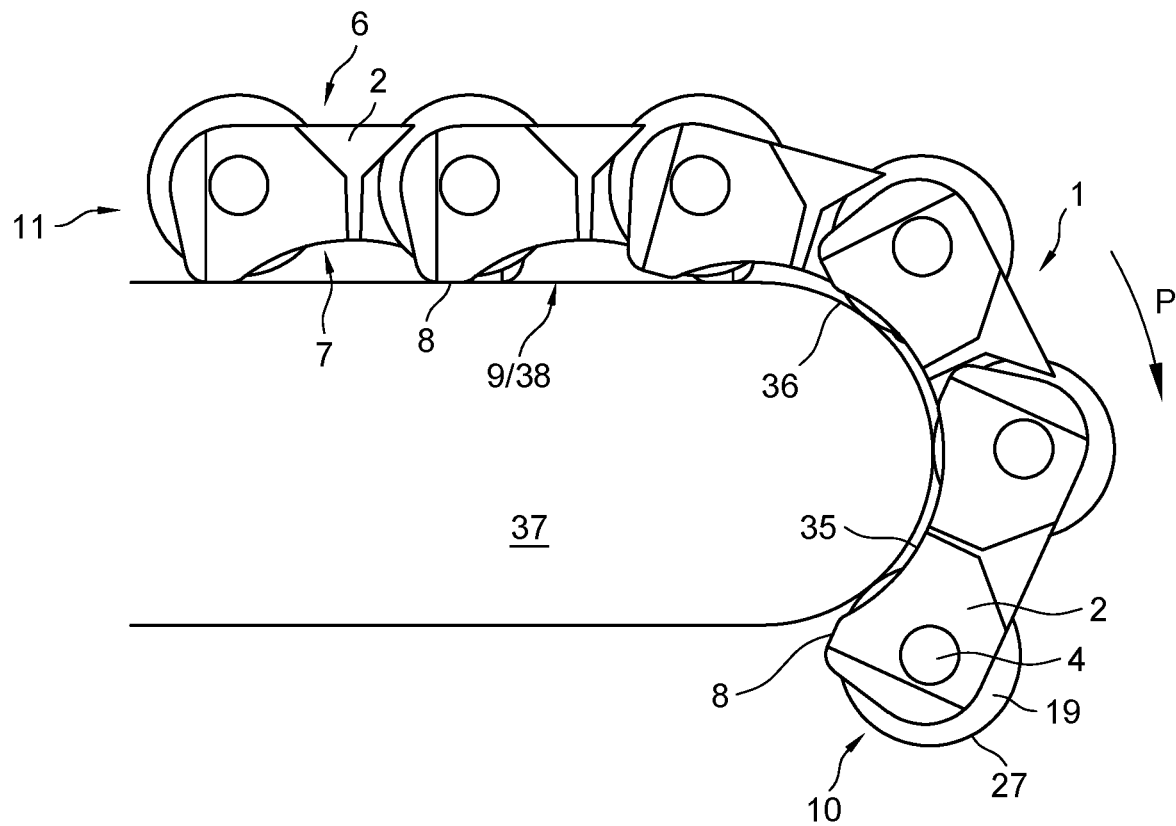
FIG. 8 shows a schematic cross section in side view of the modular conveyor mat of FIG. 1 upon rounding around a rounding nose.
Figure 9:
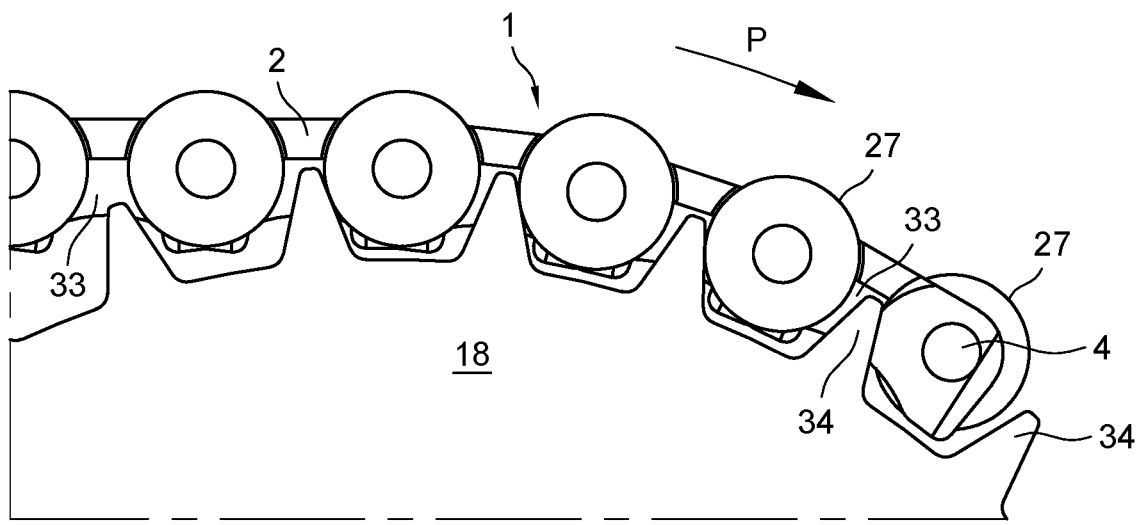
FIG. 9 shows a schematic cross section in side view of the modular conveyor mat of FIG. 1 upon rounding a bend pulley implemented as a driving gearwheel.

In FIG. 8 it is shown that the conveyor mat modules 2 in a first angular position are supported via their support surface 8 on a plane straight track guide part 9. In a second angular position, they are pivoted relative to each other and, leaving the support surface 8 and the assist support surface 35 clear, are supported via the outer surfaces 27 of the rollers 19 on a curved part 36 of the track guide. Via such an assist support surface 35, successive conveyor mat modules 2 can therefore, upon rounding, pivot relative to each other from a first position in which they are supported on a plane part of the track guide 9 formed by an upper part 38, to a second position in which they are supported on a curved part 36 of the track guide that is formed by the curved surface of a rounding nose 37.

Due to the outer surface 27 of the roller 19 projecting at least partly below the assist support surface, the roller 19 is properly accessible from the lower side to cooperate with a tread of a driving element not represented, for example a profiled strip or driving roller, while conveyor mat module 2 at the same time has its body part 5 supported via the support surface 8 on the track guide 9.

The invention is not limited to the exemplary embodiment represented here. For instance, the conveyor mat module may be shaped differently, and may for instance have differently shaped coupling parts, or be implemented without central rib or, conversely, with a plurality of central ribs. Also, the central rib may not be straight, but of wavy configuration. Further, the coupling parts at the front and the rear of the body part do not have to be staggered with respect to each other as in the exemplary embodiment, but may also be located opposite each other. In addition, the pattern of the coupling parts does not need to be regular, as in the exemplary embodiment, but may also be irregular, for instance in that the coupling elements differ in shape and dimensions, or in that coupling elements have been omitted from a regular pattern. Also, the conveyor mat may be built up with successive conveyor mat modules that are not staggered with respect to each other, and, if desired, transversely to the conveying direction only one conveyor mat module may be used. Further, the conveyor mat modules from which the conveyor mat is built up may differ mutually or, conversely, be mutually the same.

Such variants will be clear to the skilled person and are understood to fall within the scope of the invention as set forth in the following claims.

REFERENCE NUMERALS

1 Modular conveyor mat
2 Conveyor mat modules
3 Row
4 Hinge pin
5 Body part

6 Top
7 Bottom
8 Support surface
9 Plane guide
10 Front
11 Rear
12 Coupling part
13 Receiving space
14 Coupling arms
15 Central rib
16 Hinge holes
17 Free end
18 Gearwheel
19 Roller
20 Longitudinal edge
21 Roller receiving space
22 Row of rollers
23 Hinge pin locking
24 Receiving space
25 Locking element
26 Shaft hole
27 Outer surface
28 Snap connection
29 Sidewall of coupling arm
30 Collar
31 Hole
32 Sidewall of roller
33 Recess
34 Tooth
35 Assist support surface
36 Curved part of track guide
37 Rounding nose
38 Upper part of track guide
P Conveying direction
L Longitudinal axis
T Conveying surface
H Axis
S Pitch

The invention claimed is:

1. Modular conveyor mat, comprising a series of conveyor mat modules successive in conveying direction, which conveyor mat modules are provided with a body part extending transversely to a conveying direction, having a top which bounds the body part at an upper side and a bottom which bounds the body part at a lower side, wherein the bottom is provided with a support surface for supporting the body part on a plane guide, wherein the body part, at front and rear sides as viewed in the conveying direction, is provided with a series of coupling parts and receiving spaces alternately successive transversely to the conveying direction, and wherein coupling parts and receiving spaces of conveyor mat modules successive in the conveying direction interdigitate, and wherein successive conveyor mat modules are hingedly coupled with the aid of hinge pins extending transversely to the conveying direction and reaching through hinge holes in the coupling parts, and wherein at least a number of coupling parts are provided with a roller receiving space having included therein a roller which is bearing-mounted on the hinge pin, such that an outer surface of the roller is located wholly above the support surface and projects at least partly above the top of the body part, and wherein the body part at the bottom thereof is provided with a recess which, between mutually facing parts of the outer surfaces of successive rollers, leaves clear a space for therein receiving a tooth of a driving gearwheel.

2. Modular conveyor mat according to claim 1, wherein the conveyor mat modules are provided with a central rib extending transversely to the longitudinal axis, from which central rib the coupling parts, as seen transversely to the conveying direction, extend alternately forwards and rearwards in conveying direction.

3. Modular conveyor mat according to claim 2, wherein the recess in the body part is at least partly formed as a recess in the central rib.

4. Modular conveyor mat according to claim 2, wherein the central rib is located nearer to the top of the body part than to the bottom of the body part.

5. Modular conveyor mat according to claim 1, wherein the coupling parts comprise a pair of coupling arms extending on both sides of the roller receiving space, which coupling arms are each near a free end thereof provided with hinge holes.

6. Modular conveyor mat according to claim 5, wherein the conveyor mat modules are provided with a central rib extending transversely to the longitudinal axis, from which central rib the coupling parts, as seen transversely to the conveying direction, extend alternately forwards and rearwards in conveying direction, and wherein the coupling arms extend from the central rib, and wherein the recess in the body part comprises a free interspace between the coupling arms, bounded by a lower side of the central rib.

7. Modular conveyor mat according to claim 1, wherein the roller via a detachable connection is connected directly with the coupling part.

8. Modular conveyor mat according claim 1, wherein the body part is further provided with an assist support surface, in particular a curved assist support surface for cooperation with a curved part of a track guide.

9. Modular conveyor mat according to claim 8, wherein the outer surface of the roller projects at least partly below the assist support surface.

10. Modular conveyor mat according to claim 1, wherein coupling elements adjacent to a longitudinal edge of the conveyor mat are free of a roller receiving space, and are provided with a hinge pin locking.

11. Modular conveyor mat according to claim 1, wherein coupling parts successive transversely to the conveying direction of interdigitating conveyor mat modules are each provided with a roller receiving space having a roller received therein, so that a continuous row of rollers extending between the longitudinal edges of the conveyor mat is formed.

12. Modular conveyor mat according to claim 1, wherein the pitch between successive mat modules is less than 1 inch, in particular circa 0.5 inch or 15 mm.

13. Modular conveyor mat according to claim 1, with a roller density of between 3500-6000 rollers/m2 of the top surface of the conveyor mat.

14. Conveyor mat module, in particular for a conveyor mat according to claim 1, further comprising a body part extending transversely to a conveying direction, having a top which bounds the body part at an upper side and a bottom which bounds the body part at a lower side, wherein the bottom is provided with a support surface for supporting the body part on a plane guide, wherein the body part, at front and rear sides as viewed in the conveying direction, is provided with a series of coupling parts and receiving spaces alternately successive transversely to the conveying direction, and wherein coupling parts and receiving spaces can interdigitate with receiving spaces and coupling parts of correspondingly shaped conveyor mat modules successive in the conveying direction, and wherein the coupling parts are provided with hinge holes so that successive conveyor mat modules are hingedly couplable with the aid of hinge pins extending transversely to the conveying direction through the hinge holes, and wherein at least a number of coupling parts are provided with a roller receiving space for during use including therein a roller bearing-mounted on the hinge pin, such that an outer surface of the roller is located wholly above the support surface and projects at least partly above the top of the body part, and wherein the body part at the bottom thereof is provided with a recess which during use, between mutually facing parts of the outer surfaces of successive rollers, leaves clear a space for therein receiving a tooth of a driving gearwheel.

15. Conveyor mat module according to claim 14, wherein in the roller receiving space a roller is included.

16. Conveyor system comprising a modular conveyor mat according to claim 1, wherein the modular conveyor mat is provided with at least one conveyor mat module with a support surface located at the bottom of the body part of the conveyor mat module, with an assist support surface which forms a part of the bottom of the conveyor mat module that recedes or is reduced with respect to the support surface, and with at least one roller received in a roller receiving space of the conveyor mat module, an outer surface of which roller is located wholly above the support surface, projects partly with respect to the assist support surface, and projects at least partly above a top of the body part of the conveyor mat module, which conveyor system further comprises a guide track with a plane guide on which conveyor mat modules of the modular conveyor mat are supported by way of their support surfaces, and a driving element included in the track guide, a contact surface of the driving element cooperating with the tread of a part projecting with respect to an assist support surface of the outer surface of at least one roller of at least one of the conveyor mat modules.

17. Conveyor system according to claim 16, wherein the driving element comprises a profiled strip included in the guide track, with profiles of the profiled strip forming contact surfaces for cooperation with treads of rollers of successive conveyor mat modules of the modular conveyor mat in the conveying direction.

18. Conveyor system according to claim 16, wherein the contact surface of the driving element projects with respect to the guide track to drive a modular conveyor mat roller passing therealong in conveying direction.

* * * * *